(12) United States Patent
Wang

(10) Patent No.: US 8,218,027 B2
(45) Date of Patent: Jul. 10, 2012

(54) IMAGING TERMINAL HAVING COLOR CORRECTION

(75) Inventor: Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 504 days.

(21) Appl. No.: 12/421,457

(22) Filed: Apr. 9, 2009

(65) Prior Publication Data
US 2010/0259638 A1   Oct. 14, 2010

(51) Int. Cl.
H04N 9/73 (2006.01)
H04N 5/335 (2011.01)
G06K 7/10 (2006.01)
(52) U.S. Cl. .............. 348/223.1; 348/294; 235/462.01
(58) Field of Classification Search .............. 348/223.1, 348/294; 235/462.01
See application file for complete search history.

(56) References Cited

U.S. PATENT DOCUMENTS

| | | | |
|---|---|---|---|
| 5,534,915 A | 7/1996 | Sandrew | |
| 5,602,379 A * | 2/1997 | Uchimura et al. | 235/462.11 |
| 5,877,487 A * | 3/1999 | Tani et al. | 235/469 |
| 6,191,408 B1 | 2/2001 | Shinotsuka et al. | |
| 6,198,514 B1 | 3/2001 | Lee et al. | |
| 6,594,041 B1 | 7/2003 | Canata | |
| 6,813,041 B1 | 11/2004 | Moroney et al. | |
| 6,822,762 B2 | 11/2004 | Moroney et al. | |
| 7,113,649 B2 | 9/2006 | Gindele | |
| 7,717,342 B2 | 5/2010 | Wang | |
| 7,740,176 B2 | 6/2010 | Wang et al. | |
| 7,769,230 B2 * | 8/2010 | Pillman et al. | 382/167 |
| 7,770,799 B2 | 8/2010 | Wang | |
| 7,780,089 B2 | 8/2010 | Wang | |
| 7,784,696 B2 | 8/2010 | Wang | |
| 7,874,483 B2 | 1/2011 | Wang et al. | |
| 7,984,855 B2 | 7/2011 | Wang | |
| 8,002,188 B2 | 8/2011 | Wang | |
| 8,025,232 B2 | 9/2011 | Wang | |
| 2002/0186387 A1 | 12/2002 | Moroney et al. | |
| 2003/0235342 A1 | 12/2003 | Gindele | |
| 2005/0264683 A1 | 12/2005 | Kamon et al. | |
| 2005/0264684 A1 | 12/2005 | Kamon et al. | |
| 2005/0270412 A1 | 12/2005 | Kamon et al. | |

(Continued)

FOREIGN PATENT DOCUMENTS

AU   268429   9/1999

(Continued)

OTHER PUBLICATIONS

US 8,038,065, 09/2011, Wang; Ynjiun P.; et al. (withdrawn).

*Primary Examiner* — David Ometz
*Assistant Examiner* — Quang Le
(74) *Attorney, Agent, or Firm* — Heslin Rothenberg Farley & Mesiti, PC

(57) ABSTRACT

There is provided an imaging terminal comprising a hybrid monochrome and color image sensor pixel array having a first subset of pixels provided by color pixels having color filter elements and a second subset of pixels provided by monochrome pixels without color filter elements. The terminal can be operative to capture a frame of image data including monochrome image data representative of light incident on the monochrome pixels and color image data representative of light incident on the color pixels. The terminal can be operative to activate a color correction processing module that utilizes the monochrome color image data.

25 Claims, 6 Drawing Sheets

U.S. PATENT DOCUMENTS

| | | |
|---|---|---|
| 2005/0280868 A1 | 12/2005 | Kamon et al. |
| 2006/0274171 A1 | 12/2006 | Wang |
| 2006/0283952 A1* | 12/2006 | Wang ........................ 235/462.01 |
| 2007/0040914 A1 | 2/2007 | Katagiri et al. |
| 2007/0045424 A1 | 3/2007 | Wang |
| 2007/0127093 A1* | 6/2007 | Kuno ............................. 358/516 |
| 2007/0284448 A1 | 12/2007 | Wang |
| 2007/0285698 A1 | 12/2007 | Wang et al. |
| 2008/0130991 A1* | 6/2008 | O'Brien et al. ................ 382/167 |
| 2008/0143845 A1* | 6/2008 | Miki et al. ................... 348/223.1 |
| 2009/0026267 A1 | 1/2009 | Wang et al. |
| 2009/0121021 A1 | 5/2009 | Wang et al. |
| 2009/0213811 A1 | 8/2009 | Wang et al. |
| 2010/0073510 A1* | 3/2010 | Nemoto ..................... 348/223.1 |
| 2010/0219250 A1 | 9/2010 | Wang |
| 2010/0226345 A1 | 9/2010 | Qu et al. |
| 2010/0258633 A1 | 10/2010 | Wang |
| 2010/0259638 A1 | 10/2010 | Wang |
| 2010/0289915 A1 | 11/2010 | Wang |
| 2010/0315536 A1 | 12/2010 | Wang |
| 2010/0316291 A1 | 12/2010 | Deng et al. |
| 2011/0049245 A1 | 3/2011 | Wang |
| 2011/0057039 A1 | 3/2011 | Wang |
| 2011/0073654 A1 | 3/2011 | Wang et al. |
| 2011/0080500 A1 | 4/2011 | Wang et al. |
| 2011/0168779 A1 | 7/2011 | Wang et al. |
| 2011/0303750 A1 | 12/2011 | Wang |
| 2012/0002066 A1 | 1/2012 | Wang |

FOREIGN PATENT DOCUMENTS

| | | |
|---|---|---|
| AU | 2003231241 | 11/2003 |
| EP | 1139284 | 10/2001 |
| EP | 1377029 | 1/2004 |
| EP | 1500046 | 1/2005 |
| JP | 11298799 | 10/1999 |
| JP | 2001313844 | 11/2001 |
| JP | 2002077733 | 3/2002 |
| JP | 2002300746 | 10/2002 |
| JP | 2004030670 | 1/2004 |
| JP | 2005524895 | 8/2005 |
| JP | 2005348005 | 12/2005 |
| JP | 2006014277 | 1/2006 |
| JP | 2006020278 | 1/2006 |
| JP | 2006020279 | 1/2006 |
| JP | 2006050541 | 2/2006 |
| JP | 2007082180 | 3/2007 |
| JP | 2007082181 | 3/2007 |
| WO | WO-9944371 | 9/1999 |
| WO | WO-0031959 | 6/2000 |
| WO | WO-03094112 | 11/2003 |

* cited by examiner

| $C_2$ | $M_{49}$ | $M_{50}$ | $M_{51}$ | $C_3$ | $M_{52}$ | $M_{53}$ | $M_{54}$ | $C_4$ |
|---|---|---|---|---|---|---|---|---|
| $M_{55}$ | $M_{25}$ | $M_{26}$ | $M_{27}$ | $M_{28}$ | $M_{29}$ | $M_{30}$ | $M_{31}$ | $M_{56}$ |
| $M_{57}$ | $M_{32}$ | $M_9$ | $M_{10}$ | $M_{11}$ | $M_{12}$ | $M_{13}$ | $M_{33}$ | $M_{58}$ |
| $M_{59}$ | $M_{29}$ | $M_{14}$ | $M_1$ | $M_2$ | $M_3$ | $M_{15}$ | $M_{35}$ | $M_{60}$ |
| $C_5$ | $M_{36}$ | $M_{16}$ | $M_4$ | $C_1$ | $M_5$ | $M_{17}$ | $M_{37}$ | $C_6$ |
| $M_{61}$ | $M_{28}$ | $M_{18}$ | $M_6$ | $M_7$ | $M_8$ | $M_{19}$ | $M_{39}$ | $M_{62}$ |
| $M_{63}$ | $M_{40}$ | $M_{20}$ | $M_{21}$ | $M_{22}$ | $M_{23}$ | $M_{24}$ | $M_{41}$ | $M_{64}$ |
| $M_{65}$ | $M_{42}$ | $M_{43}$ | $M_{44}$ | $M_{45}$ | $M_{46}$ | $M_{47}$ | $M_{48}$ | $M_{66}$ |
| $C_7$ | $M_{67}$ | $M_{68}$ | $M_{69}$ | $C_8$ | $M_{70}$ | $M_{71}$ | $M_{72}$ | $C_9$ |

# IMAGING TERMINAL HAVING COLOR CORRECTION

FIELD OF THE INVENTION

The invention relates to sensor based terminals in general and in particular to image sensor based terminals.

BACKGROUND OF THE PRIOR ART

Bayer pattern image sensor pixel arrays are commonly employed in image sensor based terminals. A Bayer pattern filter includes one of a red, green, or blue filter applied over each individual pixel of an image sensor.

Image data captured with use of a Bayer pattern image sensor pixel array can be subject to processing in accordance with a color correction algorithm. One such algorithm is the gray world algorithm. According to a gray world algorithm, pixel values of pixel positions of image data captured with use of a Bayer pattern filter image sensor pixel array are assumed to be equal, i.e., R=G=B. Such an assumption produces an acceptable result where a target scene being subject to image capture is in fact a multi-colored scene. However, where a scene is predominantly one of a sensed color such as predominantly red, predominantly green, or predominantly blue, the gray world algorithm is susceptible to failure. A common demonstration for demonstrating shortcomings with a gray world algorithm involves capture of an image of an "all red" scene such as a red piece of paper with use of an image sensor based terminal. The terminal operating according to a gray world algorithm will generally output as a processed image an "all white" image where an originally captured image corresponds to an "all red" scene.

SUMMARY OF THE INVENTION

There is provided an imaging terminal comprising a hybrid monochrome and color image sensor pixel array having a first subset of pixels provided by color pixels having color filter elements and a second subset of pixels provided by monochrome pixels without color filter elements. The terminal can be operative to capture a frame of image data including monochrome image data representative of light incident on the monochrome pixels and color image data representative of light incident on the color pixels. The terminal can be operative to activate a color correction processing module that utilizes the monochrome image data.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE PREFERRED EMBODIMENTS

There is provided an image sensor based terminal 1000 comprising a hybrid monochrome and color image sensor pixel array 10 having a first subset of pixels provided by monochrome pixels devoid of color filter elements and a second subset of pixels provided by color sensitive pixels including color filter elements. Terminal 1000 can also include a color processing correction module 40 that can be activated for processing of image data for color correction. Terminal 1000 can be operative to capture a raw frame of image data including monochrome image data corresponding to (representative of light incident on) the monochrome pixels and color image data corresponding to (representative of light incident on) the color pixels. Terminal 1000 can be operative to process a frame of image data obtained with use of hybrid monochrome and color image sensor pixel array 10, to determine a plurality of color scale values for each of a plurality of pixel positions to provide a demosaicized frame, and can activate color correction processing module 40 which can be operative for processing of the demosaicized frame for color correction. Displays for displaying color digital image data and formats for storage and display typically require that a plurality of color scale values, (e.g., each of red, green, blue values) be determined for each of the several pixel positions. In one embodiment, color correction processing module 40 can include software program code selectively activated by a CPU of terminal 1000 (e.g., CPU 1060 as will be described herein). Color correction processing module 40 can be operative to utilize monochrome image data of a raw frame and can be operative for color correction of a demosaicized frame.

Figure 2:
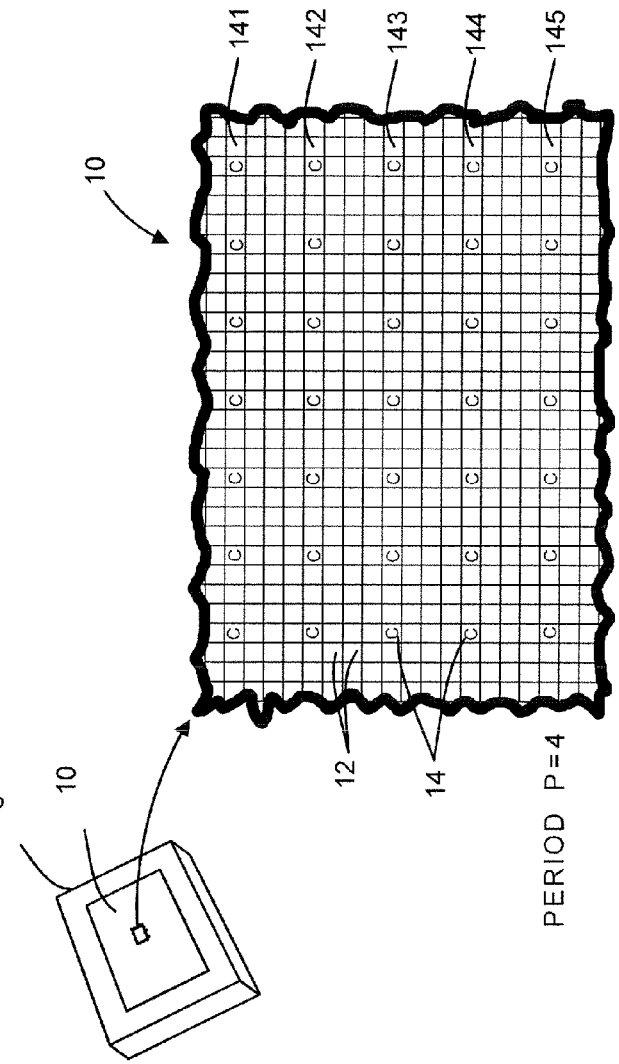
FIG. 2 is a schematic diagram illustrating features of an imaging terminal in one embodiment.
Figure 1:
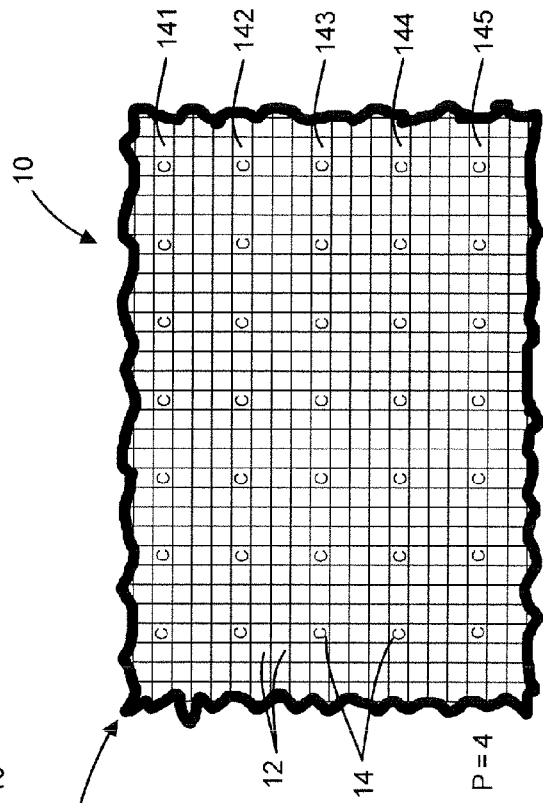
FIG. 1 is a block diagram illustrating features of an imaging terminal in one embodiment.

Referring to FIG. 2, an image sensor pixel array 10 of an image sensor based terminal 1000 can include pixels arranged in a plurality of rows of pixels and can include a first subset of monochrome pixels 12 devoid of color filter elements and a second subset of color pixels 14 including color filter elements. Such color sensitive pixels can be disposed at spaced apart positions of an image sensor pixel array 10 and can be disposed at positions uniformly or substantially uniformly throughout an image sensor pixel array 10. In one embodiment, the spaced apart color pixels of the image sensor pixel array 10, though spaced apart can follow a pattern according to a Bayer pattern. For example, where Red=R, Green=G, and Blue=B, the color pixels shown in row 141 can have the pattern . . . GRGRGRG . . . which pattern can be repeated for rows 143 and 145. The pixels of row 142 can have the pattern . . . BGBGBGB . . . , which pattern can be repeated for row 144, and such pattern can be repeated throughout image sensor pixel array 10. A color frame of image data captured with use of a color image sensor pixel array 10 having both color and monochrome pixels can include monochrome pixel image data and color pixel image data. In another embodiment, image sensor pixel array 10 can have color pixels only and can be devoid of monochrome pixels. In another embodiment, image sensor pixel array 10 can include a Bayer pattern filter. In another embodiment, image sensor pixel array 10 can be provided by a monochrome image sensor pixel array without color filter elements. Image sensor 8 can be packaged in an image sensor integrated circuit as shown in FIG. 2.

Figure 3:
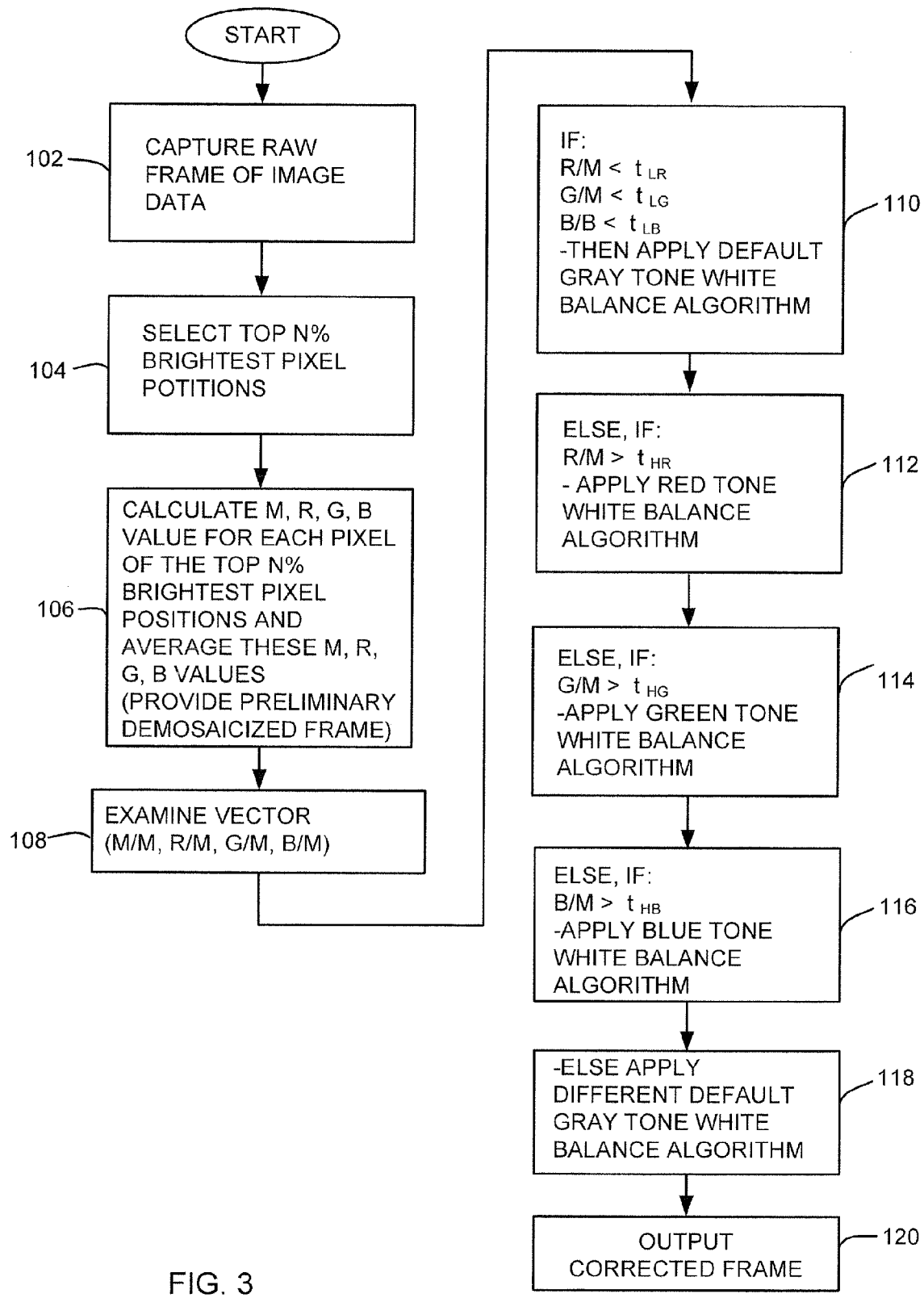
FIG. 3 is a flow diagram illustrating operation of a color correction processing module in one embodiment.

An exemplary algorithm for processing of image data for color correction utilizing both monochrome and color image data of a captured frame of image data is described with reference to the flow diagram of FIG. 3. At block 102, terminal 1000 can capture a raw frame of image data. A raw frame of image data can have the format shown in FIG. 4 including pixel values corresponding to each pixel position, where each pixel position of the frame corresponds to a pixel position of hybrid monochrome and color image sensor pixel array 10. In raw frame 200, a number of pixel positions and the relative locations of the pixel positions can correspond to the locations of the various pixels of image sensor pixel array 10. Accordingly, the pixel values of neighboring (e.g., adjacent) pixel positions can represent light reflecting at neighboring points of a target scene. Specifically, raw frame 200 can include monochrome pixel values corresponding to each monochrome pixel ($M_1 \ldots M_{72} \ldots$) position and color pixel values corresponding to each color pixel ($C_1 \ldots C_9 \ldots$) position. The pixel values corresponding to color pixel positions can be pixel values corresponding to passed color of the color pixels. In one embodiment, the filter types of the color pixel positions can vary according to a color pattern of Bayer pattern filter, i.e., positions $C_5$, $C_6$ can be red pixel positions, positions $C_2$, $C_4$, $C_1$, $C_7$, $C_9$ can be green pixel positions, and positions $C_3$, $C_8$ can be blue pixel positions.

At block 104, terminal 1000 can select the top N % (e.g., 5%) brightest pixel positions. Where a pixel of the subset of color pixels has adjacent monochrome pixels, the top 5% brightest pixel positions will normally be monochrome pixel positions (e.g., even with an all red scene red color sensitive pixels having a red filter element will filter out incident light and an adjacent monochrome pixel will likely generate a higher signal value).

At block 106, after a top percentage of brightest pixel positions are selected, monochrome (M), red (R), green (G) and blue (B) values can be determined for each pixel position. M values for M pixel positions can be determined by reading the M pixel position pixel value, and for each color pixel position by interpolating an M pixel value from neighboring M pixel positions. R values for R color pixel positions can be determined by reading the pixel value of the pixel position. For pixel positions other than red pixel positions, the R value for the pixel position can be determined utilizing pixel values of neighboring R pixels. G values for G color pixel positions can be determined by reading the pixel value of the pixel position. For pixel positions other than green pixel positions, the G value for the pixel position can be determined utilizing pixel values of neighboring G pixels. B values for B color pixel positions can be determined by reading the pixel value of the pixel position. For pixel positions other than blue pixel positions, the B value for the pixel position can be determined utilizing pixel values of neighboring B pixels. A demosaicized frame is thus provided and the R, G, B values of such frame can be output by terminal 1000 if no color correction is desired. However, if color correction is desired, color correction can be carried out according to the steps of the flow diagram of FIG. 3.

Once M, R, G, and B values are calculated for each top N % brightest pixel positions, the values can be averaged further at block 106 to determine an average of "brightest pixel" M, R, G, B values. Also at block 106, the process of determining M, R, G, B pixel values described with reference to the top N % brightest pixel positions can be carried out with respect to each pixel position or frame subject to readout. A demosaicized frame is thus provided and the R, G, B values of such frame can be output by terminal 1000 if no color correction is desired. However, if color correction is desired, color correction can be carried out according to the steps of the flow diagram of FIG. 3.

At block 108, terminal 1000 can examine the vector V=(M/M R/M G/M B/M) for determining whether a white balance algorithm is to be applied and/or parameters of such white balance algorithm. If the vector analysis indicates that a multicolor scene (having a substantially even distribution of red, green, and blue pixels) or gray tone scene (i.e. gray or with even color distribution) is represented, a default gray tone white balance algorithm can be selected. If the vector examination indicates a predominantly red scene is represented, a red tone white balance algorithm can be selected. If the vector examination indicates predominantly green scene is represented, a green tone white balance algorithm is selected. If the vector examination indicates that a predominantly blue scene is represented, a blue tone white balance algorithm is selected.

Figures 4, 5:
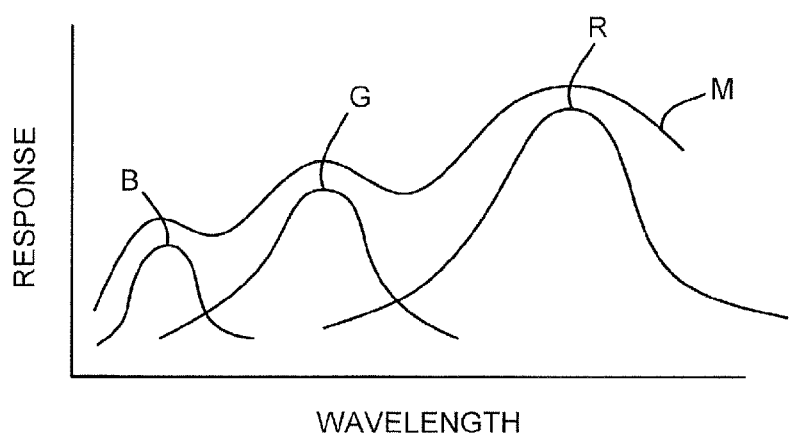
FIG. 4 is a diagram illustrating features of an image data frame in one embodiment.
FIG. 5 is an exemplary spectral response curve for an image sensor pixel array as set forth in one embodiment having monochrome pixels, red pixels, green pixels, and blue pixels.

It was determined that where a scene is predominantly of a certain color in the visible color spectrum, the average brightest pixel M value will be closely correlated with the average color pixel value of that certain color. Referring to the spectral response curve of FIG. 5, plotting an expected monochrome pixel response versus an expected response for red, green, and blue pixels, it is seen that an average monochrome pixel value will closely follow a red pixel value if a point in space being imaged is red, will closely follow a green pixel value if a point in space being imaged is green and will closely follow a blue pixel value if a point in space being imaged is blue. Accordingly, it was determined that scenes predominantly of a certain color in the visible color spectrum can be readily discriminated utilizing M pixel values obtained utilizing a hybrid monochrome and color image sensor. That is, where red light is incident on a set of R, G, B, and M pixels, then M≈R, M>>G, M>>B. If green light is incident on a set of R, G, B, and M pixels, then M≈G, M>>R, M>>B. If blue light is incident on a set of R, G, B, and M pixels, then M≈B, M>>R, M>>G.

Referring to block 110, terminal 1000 can determine that a multicolor (or true gray) scene is represented if each of the ratios R/M, G/M and B/M is below a certain low threshold where $t_{LR}$ is a low red threshold, $t_{LG}$ is a low green threshold and $t_{LB}$ is a low blue threshold. That is, if none of the ratios R/M G/M B/M is high enough to indicate a presence of a predominantly red, predominantly green, or predominantly blue scene, terminal 1000 can apply a default gray tone white balance algorithm at block 110. When applying a gray tone white balance algorithm, terminal 1000 can utilize the set of equations R=G=B to establish gain settings for red, green, and blue color scale values for each pixel position. A highest of the average R, G, or B values can be selected, and gain settings for the remaining colors can be determined accordingly. For example, if R is the highest color scale value of the R, G, and B values, green gain values $A_G$ and blue gain values $A_B$ can be determined utilizing the formulas $R=A_G G$ and $R=A_B B$. In one embodiment, the average M, R, G, and B values described herein can be utilized for detailing scaling parameters for scaling the determined unknown gain values. Once the gain values, e.g., $A_G$ and $A_B$ are determined the gain values can be applied to the demosaicized frame provided for correction of the demosaicized frame.

Referring to block 112, terminal 1000 can determine that a scene is predominantly red if the ratio R/M is above a high threshold, $t_{HR}$. If terminal 1000 at block 112 determines that the ratio R/M is above a high threshold $t_{HR}$, terminal 1000 at block 112 can determine that a scene is predominantly red and can apply a red tone white balance algorithm. When applying a red tone white balance algorithm, terminal 1000 can calculate gain values for pixel positions of a frame of image data utilizing the set of equations $R \cdot l_R = G = B$ where $l_R$ is a fraction multiplier established so that gains are established for the frame in such manner that additional red tones are appropriately included in the frame. In another embodiment, terminal 1000 can apply a red tone white balance algorithm by avoiding application of any white balance algorithm and by simply outputting the demosaicized frame provided at block 106.

Referring to block 114, terminal 1000 can determine that a scene is predominantly green if the ratio G/M is above a high threshold, $t_{HG}$. If terminal 1000 at block 114 determines that the ratio G/M is above a high threshold $t_{HG}$, terminal 1000 at block 114 can determine that a scene is predominantly green and can apply a green tone white balance algorithm. When applying a green tone white balance algorithm, terminal 1000 can calculate gain values for pixel positions of a frame of image data utilizing the set of equations $R = G \cdot l_G = B$ where $l_G$ is a fraction multiplier established so that gains are established for the frame in such manner that additional green tones are appropriately included in the frame. In another embodiment, terminal 1000 can apply a green tone white balance algorithm by avoiding application of any white balance algorithm and by simply outputting the demosaicized frame provided at block 106.

Referring to block 116, terminal 1000 can determine that a scene is predominantly blue if the ratio B/M is above a high threshold, $t_{HB}$. If terminal 1000 at block 116 determines that the ratio B/M is above a high threshold $t_{HB}$, terminal 1000 at block 116 can determine that a scene is predominantly blue and can apply a blue tone white balance algorithm. When applying a blue tone white balance algorithm, terminal 1000 can calculate gain values for pixel positions of a frame of image data utilizing the set of equations $R = G = B \cdot l_B$ where $l_B$ is a fraction multiplier established so that gains are established for the frame in such manner that additional blue tones are appropriately included in the frame. In another embodiment, terminal 1000 can apply a blue tone white balance algorithm by avoiding application of any white balance algorithm and by simply outputting the demosaicized frame provided at block 106.

Terminal 1000 at block 118 can apply a default gray tone white balance algorithm e.g., as described in connection with block 110 if none of the conditions as described at block 112, 114, or 116 are satisfied. By being capable of executing blocks 104, 106, 108, 110, 112, 114, 116, and 118, terminal 1000 can be regarded as including color correction processing module 40.

Terminal 1000 at block 120 can output a color corrected demosaicized frame color corrected by application of a determined gray tone, red tone, green tone, or blue tone white balance algorithm. For output of the color corrected frame, the frame can be written to a display of terminal 1000, and/or transmitted to an external terminal for display or storage. For output, the color corrected frame can be subject to formatting, e.g., formatting required by a display for displaying the frame or e.g., formatting according to a predetermined standard or proprietary compression algorithm.

Figure 6:
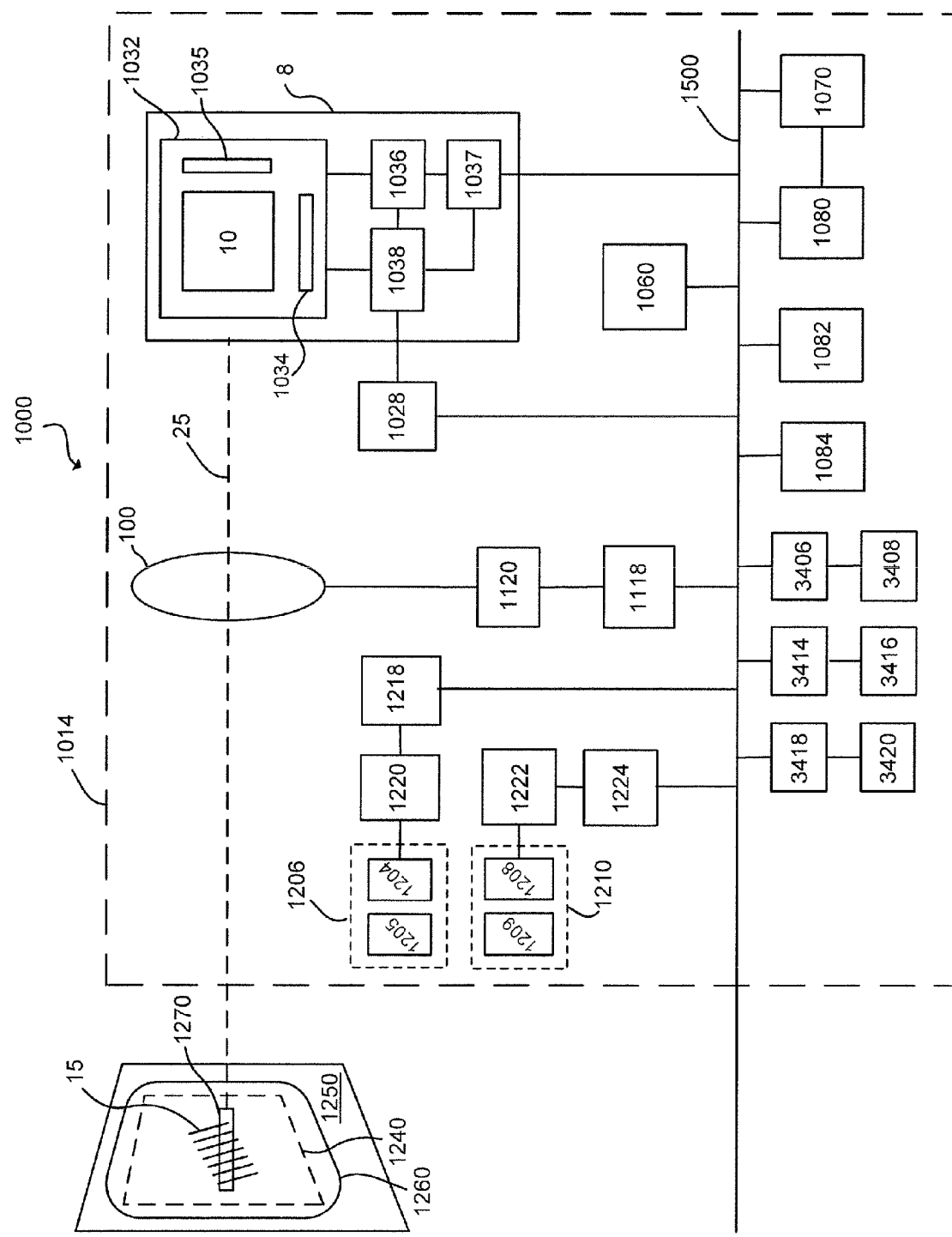
FIG. 6 is a block diagram illustrating an exemplary imaging terminal.

In FIG. 6 there is shown a hardware block diagram for an exemplary imaging terminal 1000 which can incorporate image sensor pixel array 10 and color correction module 40 as described herein.

Imaging terminal 1000 can include an image sensor circuit 1032 comprising a multiple pixel image sensor pixel array 10 having pixels arranged in rows and columns of pixels, associated column circuitry 1034 and row circuitry 1035. Associated with the image sensor circuit 1032 can be amplifier circuitry 1036, and an analog to digital converter 1037 which converts image information in the form of analog signals read out of image sensor pixel array 10 into image information in the form of digital signals. Image sensor circuit 1032 can also have an associated timing and control circuit 1038 for use in controlling e.g., the exposure period of image sensor circuit 1032, gain applied to amplifier circuitry 1036. The noted circuit components 1032, 1036, 1037, and 1038, making up image sensor 8 in one embodiment, or a subset of such components can be packaged into a common image sensor integrated circuit. In one example, image sensor integrated circuit can be provided by an MT9V022 image sensor integrated circuit available from Micron Technology, Inc. modified to include color filters disposed on a subset of pixels of the integrated circuit of image sensor pixel array to define a hybrid monochrome and color image sensor pixel array as described herein. Additional features that can be used with imaging terminal 1000 are described in U.S. patent application Ser. No. 11/174,447 entitled, Digital Picture Taking Optical Reader Having Hybrid Monochrome And Color Image Sensor Array, filed Jun. 30, 2005, incorporated herein by reference. Additional features that can be used with imaging terminal 1000 are disclosed in U.S. patent application Ser. No. 12/421,476 entitled Image Sensor Pixel Array Having Output Response Curve Including Logarithmic Pattern For Image Sensor Based Terminal, incorporated herein by reference.

In the course of operation of terminal 1000, image signals can be read out of image sensor circuit 1032, converted and stored into a system memory such as RAM 1080. A memory of terminal 1000 can include one or more of RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. In one embodiment, terminal 1000 is operative so that steps as described in connection with the flow diagram of FIG. 3 are steps executed by CPU 1060. Terminal 1000 can include a direct memory access unit (DMA) 1070 for routing image information read out from image sensor circuit 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor circuit 1032 and RAM 1080 are within the scope and the spirit of the invention.

Referring to further aspects of terminal 1000, lens assembly 100 can be adapted for focusing an image of a decodable indicia 15 located within a field of view 1240 on a substrate 1250 onto image sensor pixel array 10. Imaging light rays can be transmitted about imaging axis 25. Lens assembly 100 can be adapted to be capable of multiple focal lengths and multiple best focus distances.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generator 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, terminal 1000 can be oriented by an operator with respect to a substrate 1250 bearing decodable indicia 15 in such manner that aiming pattern 1270 is projected on a decodable indicia 15. In the example of FIG. 5, decodable indicia 15 is provided by a 1D bar code symbol. Decodable indicia 15 could also be provided by a 2D bar code symbol or optical character recognition (OCR) characters.

Each of illumination pattern light source bank 1204 and aiming pattern light source bank 1208 can include one or more light sources. Lens assembly 100 can be controlled with use of lens assembly control unit 1120. Illumination pattern light source bank 1204 can be controlled with use of illumination light source control circuit 1220. Aiming pattern light source bank 1208 can be controlled with use of aiming pattern light source bank control circuit 1222. Lens assembly control unit 1120 can output signals for control of lens assembly 100, e.g., for changing a focal length and/or a best focus distance of (a plane of optical focus of) lens assembly 100. Illumination light source bank control circuit 1220 can output signals for control of illumination pattern light source bank 1204, e.g., for changing a level of illumination output by illumination pattern light source bank 1204. Aiming pattern light source bank control circuit 1222 can output signals to aiming light source bank 1208, e.g., for changing a level of illumination output by aiming light source bank 1208.

Terminal 1000 can also include a number of peripheral devices including trigger 3408 which may be used to make active a trigger signal for activating frame readout and/or certain decoding processes. Trigger 3408 can be coupled to system bus 1500 via interface circuit 3406. Terminal 1000 can be adapted so that actuation of trigger 3408 activates a trigger signal and initiates a read attempt. Specifically, terminal 1000 can be operative so that in response to activation of a trigger signal, a succession of frames can be captured by way of read out of image information from image sensor pixel array 10 and then storage of the image information after conversion into memory 1080 (which can buffer one or more of the succession of frames at a given time). CPU 1060 can be operational to subject one or more of the succession of frames to a read attempt. For attempting to read a bar code symbol, CPU 1060 can process image data of a frame corresponding to a line of pixel positions to determine a spatial pattern of dark and light cells and can convert each light and dark cell pattern determined into a character or character string via table lookup to determine and output a message.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1218 for coupling light source bank control circuit 1220 to system bus 1500, interface circuit 1224 for coupling aiming light source bank control circuit 1222 to system bus 1500. Terminal 1000 can also include a display 3420 coupled to system bus 1500 and in communication with CPU 1060, via interface circuit 1418, as well as pointer mechanism 3410 in communication with CPU 1060 via interface circuit 3414 connected to system bus 1500.

A succession of frames of image data that can be captured and subject to the described processing can be full frames (including pixel values corresponding to each pixel over a predetermined area). A succession of frames of image data that can be captured and subject to the described processing (e.g., frame quality evaluation processing) can also be "windowed frames" comprising pixel values corresponding to less than each pixel over a predetermined area of image sensor circuit 1032 and in some cases less than about 50% and in some cases less than 10% of pixels of image sensor circuit 1032. A succession of frames of image data that can be captured and subject to the described processing can also comprise a combination of full frames and windowed frames. A full frame can be captured by selectively addressing for readout pixels of image sensor circuit 1032 corresponding to the full frame. A windowed frame can be captured by selectively addressing for readout pixels of image sensor circuit 1032 corresponding to the windowed frame. By being operative to capture a frame of image data, terminal 1000 can be regarded as an imaging terminal.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

Figure 7:
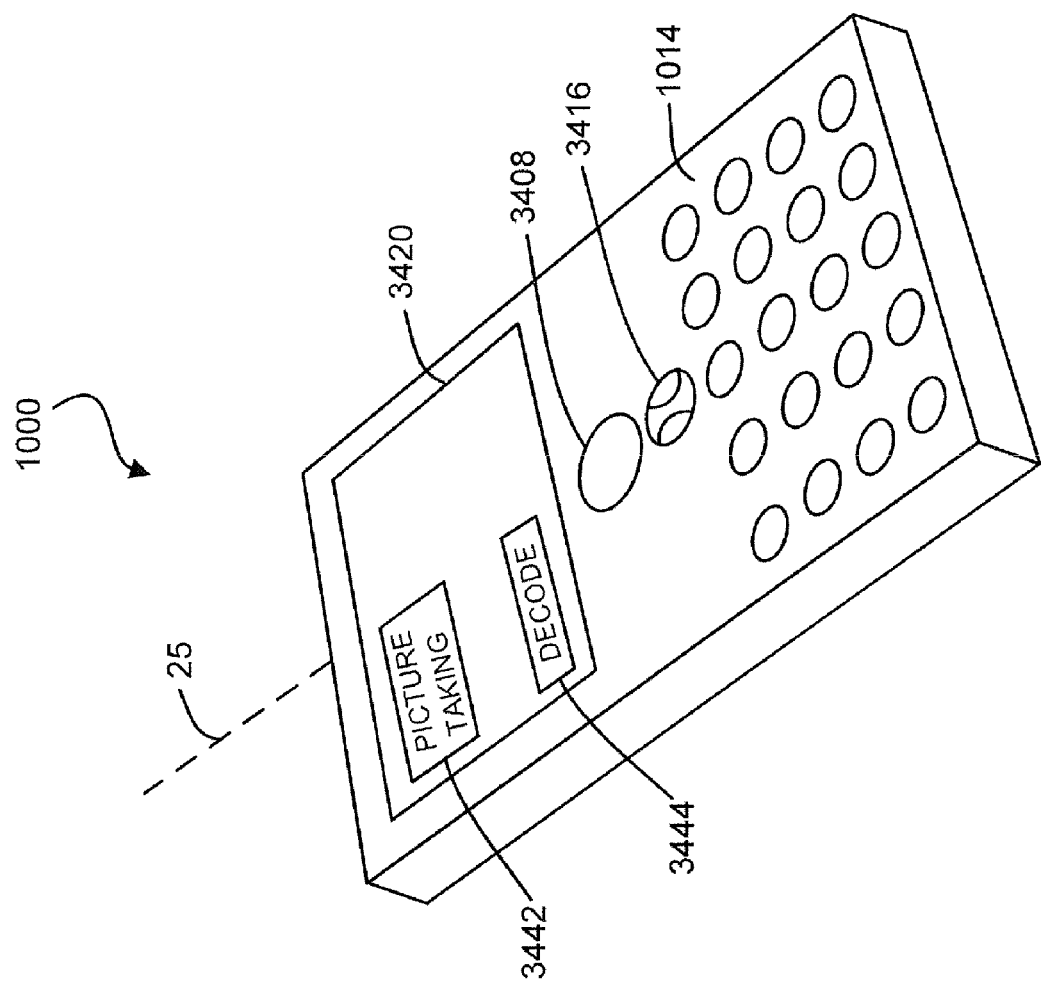
FIG. 7 is a perspective physical form view of an imaging terminal in one embodiment.

Components of terminal 1000 described with reference to FIG. 7 can be incorporated in a hand held housing, an exemplary physical form view of which is shown in FIG. 7. Image sensor 8 including image sensor pixel array 10 can be disposed in housing 1014. Referring again to the view of FIG. 6, the dashed-in border of FIG. 6 is labeled border 1014 to indicate that elements within border 1014 can be disposed within hand held housing 1014.

In a further aspect, terminal 1000 can have a plurality of operator activated operating modes.

In one embodiment, terminal 1000 can have a first operator activated picture taking mode and a second operator activated indicia decode mode. Terminal 1000 can be operative so that image capture and processing can be activated responsively to an operator actuation of trigger 3408 whether a picture taking mode or an indicia decode mode is active. However, terminal 1000 can be operative so that image data processing carried out by terminal 1000 is differentiated depending on which of a first picture taking mode or a second indicia decode mode is active.

In one embodiment, terminal 1000 can be operative so that a picture taking mode can be activated by selection of displayed button 3442 displayed on display 3420 of terminal 1000. Terminal 1000 can be operative so that button 3442 can be selected with use of pointer mechanism 3410. Terminal 1000 can also be operative so that an indicia decode mode can be activated by selection of displayed button 3444 displayed on display 3420 of terminal 1000. Terminal 1000 can be operative so that button 3444 can be selected with use of pointer mechanism 3410 of terminal 1000. Terminal 1000 can also be operative so that image capturing and processing can be activated by actuation of trigger 3408 irrespective of whether a picture taking mode or indicia decode mode is active.

Figure 8:
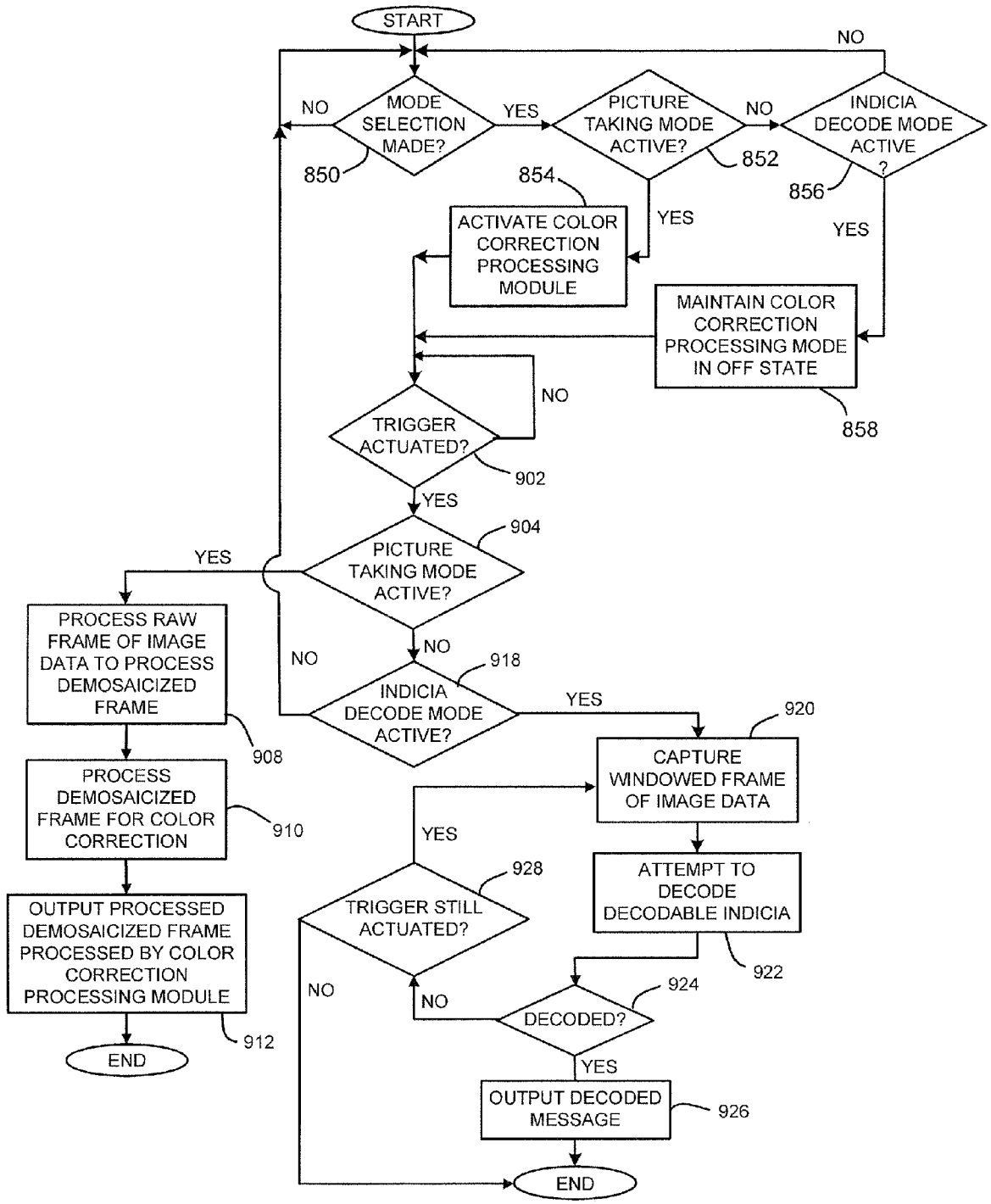
FIG. 8 is a flow diagram illustrating exemplary operation of a picture taking mode of an imaging terminal and an indicia decode mode of an imaging terminal.

Terminal 1000 can be operative according to the flow diagram of FIG. 8 so that a processing of image data is differentiated depending on which of a picture taking mode or indicia decode mode is active. At block 850, terminal 1000 can wait for a mode selection. If a mode selection is a picture taking mode (block 852) terminal 1000 can activate color correction processing module 40. If an indicia decode mode is selected (block 856) terminal 1000 can maintain color correction processing module (block 858) in an off state.

Terminal 1000 can be operative so that if trigger 3408 is actuated at block 902 with picture taking mode active (block 904), terminal 1000 can proceed to block 908 to process a raw frame of image data including both monochrome and color image data so that terminal 1000 obtains a demosaicized frame wherein terminal 1000 determines a plurality of color scale values (e.g., red, green, and blue) for each of a plurality of pixel positions. Further, when a picture taking mode has been made active, terminal 1000 in accordance with color correction processing module 40 being made active can proceed to block 910 to process a demosaicized frame for color correction. As part of such processing, terminal 1000 can apply a white balance algorithm if conditions determined utilizing monochrome image data of the raw frame apply. As part of such processing, terminal 1000 can avoid application of a white balance algorithm if conditions determined by utilizing monochrome image data apply. When color correction processing module is 40 active, terminal 1000 can execute blocks 104, 106, 108, 110, 112, 114, 116, and 118 as described herein in connection with FIG. 3. Terminal 1000 at block 912 can output a visual display frame of image data, e.g., by writing a visual display frame to a display on an onboard memory of terminal 1000 or to an external terminal for display or storage.

If trigger 3408 is actuated (block 902) with indicia decode mode active (block 918) terminal 1000 can proceed to block 920 to capture a windowed frame of image data (e.g., monochrome pixels of image sensor pixel array 10 can be selectively addressed to the exclusion of color pixels C of the image sensor pixel array). Terminal 1000 can then proceed to block 922 to attempt to determine a decoded message that has been encoded with a decodable indicia represented in the image data. If terminal 1000 has successfully decoded an encoded message, terminal 1000 can output the message at block 926, e.g., by writing the decoded message to memory 1082, 1084, and/or an onboard display 3420, and/or an external terminal for storage or display. If a message is not successfully decoded (block 924) or if trigger 3408 remains activated (block 928), terminal 1000 can continue to capture (block 920) frames of image data and subject the image data captured to decode attempts until a message is decoded or a trigger 3408 is deactivated (e.g., released).

It is seen that terminal 1000 can be operative so that terminal 1000 with an indicia decode mode active can process a frame of image data for attempting to decode an encoded message in response to trigger 3408 being actuated to activate a read attempt. Further, it is seen that terminal 1000 can be operative so that terminal 1000, when an indicia decode mode has been made active can maintain color correction processing module 40 in an inactive state so that terminal 1000 does not process and is restricted from processing a frame of image data for color correction when terminal 1000 operates in an indicia decode mode.

A small sample of systems methods and apparatus that are described herein is as follows:

A1. An imaging terminal comprising:
a hybrid monochrome and color image sensor pixel array having a first subset of pixels and a second subset of pixels, the first subset of pixels being a monochrome subset of pixels devoid of color filter elements and a second subset of pixels being a color sensitive subset of pixels including color filter elements;
a lens assembly for use in focusing an image of a target scene onto the hybrid monochrome and color image sensor array; and
a hand held housing, wherein the hybrid monochrome and color image sensor pixel array is disposed in the hand held housing;
wherein the imaging terminal is operative, in response to an operator initiated command, to capture a raw frame of image data, the raw frame of image data having a first subset of pixel values and a second subset of pixel values, the first subset of pixel values being monochrome pixel values representing light incident at the first subset of pixels, the second subset of pixel values being color pixel values representing light incident at the second subset of pixels;
wherein the imaging terminal is further operative to process the raw frame of image data for providing a demosaicized frame of image data;
wherein the imaging terminal includes a color correction processing module that utilizes pixel values of the first subset of pixel values, the color correction processing module being operative for color correction of the demosaicized frame of image data.

A2. The imaging terminal of claim A1, wherein the color correction processing module has an active state and an inactive state and wherein the imaging terminal is operative so that in a first operating mode of the imaging terminal, the color correction processing module is active to process a frame of image data and further so that in a second operating mode of the imaging terminal, the color correction processing module is maintained in an inactive state so that a captured frame of image data is not subject to processing by the color correction processing module.

A3. The imaging terminal of claim A1, wherein the imaging terminal is operative to output a visual display frame of image data by one or more of (a) displaying the visual display frame of image data on a display, (b) writing the visual display frame of image data to a memory of the imaging terminal, or (c) transmitting the visual display frame of image data to an external device for display and/or storage.

A4. The imaging terminal of claim A1, wherein the color correction processing module is operative to utilize pixel values of the first set of pixel values for determining whether to apply a white balancing algorithm to the demosaicized frame of image data.

A5. The imaging terminal of claim A1, wherein the color correction processing module is operative to utilize pixel values of the first set of pixel values by examination of the vector quantities M/R, M/G, M/B, where M is the average monochrome pixel value for a brightest predetermined percentage of pixel positions of the raw frame and R, G, B, are respective average red, green, and blue pixel values for the brightest predetermined percentage of pixel positions of the raw frame.

A6. The imaging terminal of claim A1, wherein the color correction processing module is operative to avoid application of a white balancing algorithm to the demosaicized frame if examination of one of the vector quantities M/R, M/G or M/B indicates that a frame currently being subject to processing represents a color imbalanced scene.

A7. The imaging terminal of claim A1, wherein the color pixels of the image sensor pixel array include red, green, and blue pixels uniformly or substantially uniformly distributed at spaced apart positions of the image sensor pixel array.

A8. The imaging terminal of claim A1, wherein the color correction module is operative to determine a brightest predetermined percentage of pixel positions of the raw frame and wherein the color correction processing module is further operative to calculate an average M value for the brightest predetermined percentage of pixel positions.

A9. The imaging terminal of claim A1, wherein the imaging terminal is operative in an indicia decode mode in which the imaging terminal attempts to decode a decodable indicia represented in a frame of image data captured during operation of the imaging terminal in the indicia decode mode, the color correction processing module having an active state and an inactive state, the imaging terminal being operative to maintain the color correction processing module in an inactive state when the imaging terminal is operated in an indicia decode mode of operation.

B1. An imaging terminal comprising:

a hybrid monochrome and color image sensor pixel array having a first subset of pixels and a second subset of pixels, the first subset of pixels being a monochrome subset of pixels devoid of color filter elements and a second subset of pixels being a color sensitive subset of pixels including color filter elements;

a lens assembly for use in focusing an image of a target scene onto the hybrid monochrome and color image sensor array; and a hand held housing, wherein the hybrid monochrome and color image sensor pixel array is disposed in the hand held housing;

wherein the imaging terminal is operative, in response to an operator initiated command, to capture a raw frame of image data, the raw frame of image data having a first subset of pixel values and a second subset of pixel values, the first subset of pixel values being monochrome pixel values representing light incident at the first subset of pixels, the second subset of pixel values being color pixel values representing light incident at the second subset of pixels;

wherein the imaging terminal further includes a color correction processing module that utilizes pixel values of the first subset of pixel values, the color correction processing module being operative for color correction of a frame of image data for output by the imaging terminal;

wherein the imaging terminal is operative in an operator selectable picture taking mode of operation and an operator selectable indicia decode mode of operation;

wherein the color correction processing module includes an active state and an inactive state;

wherein the imaging terminal is operative so that when the imaging terminal is operated in the picture taking mode the color correction processing module is active so a frame captured in response to an operator initiated command to capture and process a frame of image data when the imaging terminal is operated in the picture taking mode is subject to color correction by the color correction processing module; and wherein the imaging terminal is further operative so that when the imaging terminal is operated in the indicia decode mode the color correction processing module is maintained in the inactive state so that frames of image data captured in response to an operator initiated command to capture and process frames of image data when the imaging terminal is operated in the indicia decode mode are not subject to color correction by the color correction processing module.

B2. The imaging terminal of claim B1, wherein the imaging terminal attempts to decode a decodable indicia represented in captured image data when operated in the indicia decode mode.

B3. The imaging terminal of claim B1, wherein the imaging terminal when operated in the indicia decode mode is operative to output a decoded message by one or more of writing the decoded message to a memory of the terminal or by transmitting the decoded message to an external device.

B4. The imaging terminal of claim B1, wherein the imaging terminal when operated in the picture taking mode is operative to process the raw frame of image data to provide a demosaicized frame, and wherein the color correction processing module is operative to process the demosaicized frame.

B5. The imaging terminal of claim B1, wherein the color pixels of the image sensor pixel array include red, green, and blue pixels uniformly or substantially uniformly distributed at spaced apart positions of the image sensor pixel array.

B6. The imaging terminal of claim B1, wherein the color correction module is operative to determine a brightest predetermined percentage of pixel positions of the raw frame and wherein the color correction processing module is further operative to calculate an average M value for the brightest predetermined percentage of pixel positions.

B7. The imaging terminal of claim B1, wherein the color correction processing module is operative to utilize pixel values of the first set of pixel values for determining whether to apply a white balancing algorithm to the demosaicized frame of image data.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment.

The invention claimed is:

1. An imaging terminal comprising:

a hybrid monochrome and color image sensor pixel array having a first subset of pixels and a second subset of pixels, the first subset of pixels being a monochrome subset of pixels devoid of color filter elements and a second subset of pixels being a color sensitive subset of pixels including color filter elements;

a lens assembly for use in focusing an image of a target scene onto the hybrid monochrome and color image sensor array; and a hand held housing, wherein the hybrid monochrome and color image sensor pixel array is disposed in the hand held housing;

wherein the imaging terminal is operative, in response to an operator initiated command, to capture a raw frame of image data, the raw frame of image data having a first subset of pixel values and a second subset of pixel values, the first subset of pixel values being monochrome pixel values representing light incident at the first subset of pixels, the second subset of pixel values being color pixel values representing light incident at the second subset of pixels;

wherein the imaging terminal is further operative to process the raw frame of image data for providing a demosaicized frame of image data;

wherein the imaging terminal includes a color correction processing module that utilizes pixel values of the first subset of pixel values, the color correction processing module being operative for color correction of the demosaicized frame of image data;

wherein the color correction processing module is characterized by one or more of (a), (b), and (c) as follows: (a) the color correction processing module is operative to utilize pixel values of the first subset of pixel values by examination of the vector quantities M/R, M/G, M/B, where M is the average monochrome pixel value for a brightest predetermined percentage of pixel positions of the raw frame and R, G, B, are respective average red, green, and blue pixel values for the brightest predetermined percentage of pixel positions of the raw frame; (b) the color correction processing module is operative to avoid application of a white balancing algorithm to the demosaicized frame if examination of one of the vector quantities M/R, M/G or M/B indicates that a frame currently being subject to processing represents a color imbalanced scene; and (c) the color correction module is operative to determine a brightest predetermined percentage of pixel positions of the raw frame and wherein the color correction processing module is further operative to calculate an average M value for the brightest predetermined percentage of pixel positions.

2. The imaging terminal of claim 1, wherein the color correction processing module has an active state and an inactive state and wherein the imaging terminal is operative so that in a first operating mode of the imaging terminal, the color correction processing module is active to process a frame of image data and further so that in a second operating mode of the imaging terminal, the color correction processing module is maintained in an inactive state so that a captured frame of image data is not subject to processing by the color correction processing module.

3. The imaging terminal of claim 1, wherein the imaging terminal is operative to output a visual display frame of image data by one or more of (a) displaying the visual display frame of image data on a display, (b) writing the visual display frame of image data to a memory of the imaging terminal, or (c) transmitting the visual display frame of image data to an external device for display and/or storage.

4. The imaging terminal of claim 1, wherein the color correction processing module is operative to utilize pixel values of the first subset of pixel values for determining whether to apply a white balancing algorithm to the demosaicized frame of image data.

5. The imaging terminal of claim 1, wherein the color correction processing module is operative to utilize pixel values of the first subset of pixel values by examination of the vector quantities M/R, M/G, M/B, where M is the average monochrome pixel value for a brightest predetermined percentage of pixel positions of the raw frame and R, G, B, are respective average red, green, and blue pixel values for the brightest predetermined percentage of pixel positions of the raw frame.

6. The imaging terminal of claim 1, wherein the color correction processing module is operative to avoid application of a white balancing algorithm to the demosaicized frame if examination of one of the vector quantities M/R, M/G or M/B indicates that a frame currently being subject to processing represents a color imbalanced scene.

7. The imaging terminal of claim 1, wherein the color pixels of the image sensor pixel array include red, green, and blue pixels uniformly or substantially uniformly distributed at spaced apart positions of the image sensor pixel array.

8. The imaging terminal of claim 1, wherein the color correction module is operative to determine a brightest predetermined percentage of pixel positions of the raw frame and wherein the color correction processing module is further operative to calculate an average M value for the brightest predetermined percentage of pixel positions.

9. The imaging terminal of claim 1, wherein the imaging terminal is operative in an indicia decode mode in which the imaging terminal attempts to decode a decodable indicia represented in a frame of image data captured during operation of the imaging terminal in the indicia decode mode, the color correction processing module having an active state and an inactive state, the imaging terminal being operative to maintain the color correction processing module in an inactive state when the imaging terminal is operated in an indicia decode mode of operation.

10. An imaging terminal comprising:
a hybrid monochrome and color image sensor pixel array having a first subset of pixels and a second subset of pixels, the first subset of pixels being a monochrome subset of pixels devoid of color filter elements and a second subset of pixels being a color sensitive subset of pixels including color filter elements;
a lens assembly for use in focusing an image of a target scene onto the hybrid monochrome and color image sensor array; and
a hand held housing, wherein the hybrid monochrome and color image sensor pixel array is disposed in the hand held housing;
wherein the imaging terminal is operative, in response to an operator initiated command, to capture a raw frame of image data, the raw frame of image data having a first subset of pixel values and a second subset of pixel values, the first subset of pixel values being monochrome pixel values representing light incident at the first subset of pixels, the second subset of pixel values being color pixel values representing light incident at the second subset of pixels;
wherein the imaging terminal further includes a color correction processing module that utilizes pixel values of the first subset of pixel values, the color correction processing module being operative for color correction of a frame of image data for output by the imaging terminal;
wherein the imaging terminal is operative in an operator selectable picture taking mode of operation and an operator selectable indicia decode mode of operation;
wherein the color correction processing module includes an active state and an inactive state;
wherein the imaging terminal is operative so that when the imaging terminal is operated in the picture taking mode the color correction processing module is active so a frame captured in response to an operator initiated command to capture and process a frame of image data when the imaging terminal is operated in the picture taking mode is subject to color correction by the color correction processing module; and
wherein the imaging terminal is further operative so that when the imaging terminal is operated in the indicia decode mode the color correction processing module is maintained in the inactive state so that frames of image data captured in response to an operator initiated command to capture and process frames of image data when the imaging terminal is operated in the indicia decode mode are not subject to color correction by the color correction processing module.

11. The imaging terminal of claim 10, wherein the imaging terminal attempts to decode a decodable indicia represented in captured image data when operated in the indicia decode mode.

12. The imaging terminal of claim 10, wherein the imaging terminal when operated in the indicia decode mode is operative to output a decoded message by one or more of writing the decoded message to a memory of the terminal or by transmitting the decoded message to an external device.

13. The imaging terminal of claim 10, wherein the imaging terminal when operated in the picture taking mode is operative to process the raw frame of image data to provide a demosaicized frame, and wherein the color correction processing module is operative to process the demosaicized frame.

14. The imaging terminal of claim 10, wherein the color pixels of the image sensor pixel array include red, green, and blue pixels uniformly or substantially uniformly distributed at spaced apart positions of the image sensor pixel array.

15. The imaging terminal of claim 10, wherein the color correction module is operative to determine a brightest predetermined percentage of pixel positions of the raw frame and wherein the color correction processing module is further operative to calculate an average M value for the brightest predetermined percentage of pixel positions.

16. The imaging terminal of claim 10, wherein the color correction processing module is operative to utilize pixel values of the first subset of pixel values for determining whether to apply a white balancing algorithm to a demosaicized frame of image data.

17. An imaging terminal comprising:
a hybrid monochrome and color image sensor pixel array having a first subset of pixels and a second subset of pixels, the first subset of pixels being a monochrome subset of pixels devoid of color filter elements and a second subset of pixels being a color sensitive subset of pixels including color filter elements;
a lens assembly for use in focusing an image of a target scene onto the hybrid monochrome and color image sensor array; and
a hand held housing, wherein the hybrid monochrome and color image sensor pixel array is disposed in the hand held housing;
wherein the imaging terminal is operative, in response to an operator initiated command, to capture a raw frame of image data, the raw frame of image data having a first subset of pixel values and a second subset of pixel values, the first subset of pixel values being monochrome pixel values representing light incident at the first subset of pixels, the second subset of pixel values being color pixel values representing light incident at the second subset of pixels;
wherein the imaging terminal is further operative to process the raw frame of image data for providing a demosaicized frame of image data;
wherein the imaging terminal includes a color correction processing module that utilizes pixel values of the first subset of pixel values, the color correction processing module being operative for color correction of the demosaicized frame of image data; and
wherein the color correction processing module is operative to utilize pixel values of the first subset of pixel values for determining whether to apply a white balancing algorithm to the demosaicized frame of image data.

18. The imaging terminal of claim 17, wherein the color correction processing module has an active state and an inactive state and wherein the imaging terminal is operative so that in a first operating mode of the imaging terminal, the color correction processing module is active to process a frame of image data and further so that in a second operating mode of the imaging terminal, the color correction processing module is maintained in an inactive state so that a captured frame of image data is not subject to processing by the color correction processing module.

19. The imaging terminal of claim 17, wherein the imaging terminal is operative to output a visual display frame of image data by one or more of (a) displaying the visual display frame of image data on a display, (b) writing the visual display frame of image data to a memory of the imaging terminal, or (c) transmitting the visual display frame of image data to an external device for display and/or storage.

20. The imaging terminal of claim 17, wherein the color pixels of the image sensor pixel array include red, green, and blue pixels uniformly or substantially uniformly distributed at spaced apart positions of the image sensor pixel array.

21. The imaging terminal of claim 17, wherein the imaging terminal is operative in an indicia decode mode in which the imaging terminal attempts to decode a decodable indicia represented in a frame of image data captured during operation of the imaging terminal in the indicia decode mode, the color correction processing module having an active state and an inactive state, the imaging terminal being operative to maintain the color correction processing module in an inactive state when the imaging terminal is operated in an indicia decode mode of operation.

22. An imaging terminal comprising:
a hybrid monochrome and color image sensor pixel array having a first subset of pixels and a second subset of pixels, the first subset of pixels being a monochrome subset of pixels devoid of color filter elements and a second subset of pixels being a color sensitive subset of pixels including color filter elements;
a lens assembly for use in focusing an image of a target scene onto the hybrid monochrome and color image sensor array; and
a hand held housing, wherein the hybrid monochrome and color image sensor pixel array is disposed in the hand held housing;
wherein the imaging terminal is operative, in response to an operator initiated command, to capture a raw frame of image data, the raw frame of image data having a first subset of pixel values and a second subset of pixel values, the first subset of pixel values being monochrome pixel values representing light incident at the first subset of pixels, the second subset of pixel values being color pixel values representing light incident at the second subset of pixels;
wherein the imaging terminal is further operative to process the raw frame of image data for providing a demosaicized frame of image data;
wherein the imaging terminal includes a color correction processing module that utilizes pixel values of the first subset of pixel values, the color correction processing module being operative for color correction of the demosaicized frame of image data;
wherein the imaging terminal is operative in an indicia decode mode in which the imaging terminal attempts to decode a decodable indicia represented in a frame of image data captured during operation of the imaging terminal in the indicia decode mode, the color correction processing module having an active state and an inactive state, the imaging terminal being operative to maintain the color correction processing module in an inactive state when the imaging terminal is operated in an indicia decode mode of operation.

23. The imaging terminal of claim 22, wherein the color correction processing module has an active state and an inactive state and wherein the imaging terminal is operative so that in a first operating mode of the imaging terminal, the color correction processing module is active to process a frame of image data and further so that in a second operating mode of the imaging terminal, the color correction processing module is maintained in an inactive state so that a captured frame of image data is not subject to processing by the color correction processing module.

24. The imaging terminal of claim 22, wherein the imaging terminal is operative to output a visual display frame of image data by one or more of (a) displaying the visual display frame of image data on a display, (b) writing the visual display frame of image data to a memory of the imaging terminal, or (c) transmitting the visual display frame of image data to an external device for display and/or storage.

25. The imaging terminal of claim 22, wherein the color pixels of the image sensor pixel array include red, green, and blue pixels uniformly or substantially uniformly distributed at spaced apart positions of the image sensor pixel array.

* * * * *